United States Patent
Chen et al.

(10) Patent No.: US 8,098,680 B2
(45) Date of Patent: Jan. 17, 2012

(54) METHOD AND SYSTEM FOR MANAGING TRANSMISSIONS IN A WIRELESS COMMUNICATION NETWORK

(75) Inventors: Ye Chen, Schaumburg, IL (US); Ivan N. Vukovic, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1069 days.

(21) Appl. No.: 11/838,456

(22) Filed: Aug. 14, 2007

(65) Prior Publication Data

US 2009/0047986 A1    Feb. 19, 2009

(51) Int. Cl.
*H04L 12/413* (2006.01)

(52) U.S. Cl. ........ 370/447; 370/318; 370/335; 455/522; 455/69; 455/13.4; 455/127.5; 455/63.1; 713/320

(58) Field of Classification Search .......... 455/522, 455/69, 13.4, 127.1–127.5, 88, 63.1, 422.1, 455/422.2; 370/318, 335, 447; 713/320
See application file for complete search history.

(56) References Cited

U.S. PATENT DOCUMENTS

| | | | |
|---|---|---|---|
| 6,067,458 A * | 5/2000 | Chen | 455/522 |
| 6,377,809 B1 * | 4/2002 | Rezaiifar et al. | 455/455 |
| 6,615,050 B1 * | 9/2003 | Tiedemann et al. | 455/522 |
| 6,810,255 B2 * | 10/2004 | Chen et al. | 455/437 |
| 6,990,117 B1 | 1/2006 | Tanaka et al. | |
| 2003/0054825 A1 * | 3/2003 | Chen et al. | 455/442 |
| 2003/0224775 A1 * | 12/2003 | Suda et al. | 455/422.1 |
| 2004/0162098 A1 * | 8/2004 | Wei et al. | 455/522 |
| 2005/0250528 A1 | 11/2005 | Song et al. | |

FOREIGN PATENT DOCUMENTS

| | | |
|---|---|---|
| JP | 11127158 A | 5/1999 |
| JP | H11127158 | 5/1999 |
| KR | 100240643 B1 | 3/1999 |
| KR | 1019990016056 A | 3/1999 |
| WO | 02082751 A2 | 10/2002 |

OTHER PUBLICATIONS

ANS/IEEE Std 802.11 1999 Edition, IEEE Standard for Information technology, Telecommunications and information exchange between systems- Local and metropolitan area networks-Specific requirements, Part 11: Wireless LAN Medium Access Control (MAC) and Physical Layer (PHY) Specifications, Adopted by the ISO/IEC and redesignated as ISO/IEC 8802-11:1999(E), Sponsor LAN/MAN Standards Committee of the IEEE Computer Society, Sect. 9.2, pp. 72-86.

* cited by examiner

*Primary Examiner* — Shaima Q Aminzay
(74) *Attorney, Agent, or Firm* — Steven May (57) ABSTRACT

The present invention provides a method for managing transmissions in a wireless communication network (100). The method at a first node (102) of a plurality of nodes of the wireless communication network includes transmitting (304) a data frame to a second node (104) using a first transmit power level. The method further includes determining (306) whether an acknowledgement for the transmitted data frame is received from the second node. Further, the method includes determining (308) a cause of unsuccessful transmission when the acknowledgement is not received from the second node. Moreover, the method includes re-transmitting (310) the data frame to the second node using a second transmit power level when the cause of unsuccessful transmission is determined as a collision. Furthermore, the method includes setting (312) a transmit power level of the first node to a third transmit power level.

26 Claims, 6 Drawing Sheets

METHOD AND SYSTEM FOR MANAGING TRANSMISSIONS IN A WIRELESS COMMUNICATION NETWORK

The present invention generally relates to a wireless communication network, and more particularly, to a method and system for managing transmissions in the wireless communication network.

BACKGROUND OF THE INVENTION

Wireless communication networks are very popular these days. The popularity of wireless LANs is a testament primarily to their convenience, cost efficiency, and ease of integration with other communication networks and network components. In a wireless communication network, various communication devices interact with each other without any electronic conductors or wires. These days wireless communication devices are important tools for transmitting and receiving data and information over a wireless communication link or a wireless transmission channel. Examples of the wireless communication network include a Wireless Local Area Network (WLAN), a Wireless Wide Area Network (WWAN), a Wireless Fidelity Network (Wi-Fi), a Wireless Interoperability for Microwave Access (WIMAX), a High Performance Radio Local Area Network (HIPERLAN), etc. Examples of the wireless communication link or a wireless transmission channel include, but are not limited to, a radio wave link, an electromagnetic wave link, a Bluetooth® link, a microwave link, and an Infrared Data Association (IrDA) link.

Each node in the wireless communication network has a specified communication range. A node can directly transmit the data frames to only those nodes that are within the specified communication range of the node. In the wireless communication network a single wireless transmission channel is shared by more than one node that is in same communication range. These nodes transfer data frames from one node to another by using the wireless transmission channel. The communication range of a node depends on the transmit power level that is being used by the node to transmit the data frame. If the transmit power level used by the node is high then the communication range of the node will cover more number of nodes. However, if the transmit power level used by the node is low, then the communication range of the node will cover less number of nodes. The high transmit power level results in more interference among nodes that are in the same communication range and therefore reduces the capacity of the wireless communication network. The nodes that are out of communication range of a node are hidden to the node; and hence, the node cannot sense the presence or any transmission activity on these nodes. Such nodes are called hidden nodes or hidden terminals. Increment in the number of hidden nodes leads to more collisions in the wireless transmission channel and results in unsuccessful transmissions and loss of data or information in the wireless communication network. When two or more nodes simultaneously transmit data frames to a destination node, then a data frame transmitted using higher transmit power level might be successfully delivered at the destination node. Simultaneously, the data frames transmitted using lower transmit power level are suppressed at the destination node. This phenomenon is known as capture effect. According to the principles of capture effect, the data frame that was transmitted using a lower transmit power level is suppressed by the data frame transmitted using the higher transmit power level, and only the data frame transmitted using higher transmit power level might receive successfully at the destination node if the differentiation between the higher and lower transmit power level is big enough.

There are several methods that exist to solve the hidden terminal problem and to manage transmission of data frames in the wireless communication network. One of these methods uses a close loop (e.g. Ready to Send (RTS)/Clear to Send (CTS) frames) or open loop communication between a sending node and a receiving node. The open or close loop communication facilitates exchange of information, such as reception characteristics of the receiving node, to sense the wireless transmission channel prior to the actual data transmission. This practice ensures use of optimal transmit power for the actual data transmission at the sending node. In this method, a sending node sends an RTS frame to the receiving node, and the actual data frame is sent only when the sending device has received a CTS frame from the receiving node. The exchange of RTS/CTS only partially reduces the impact of the hidden terminal problem. The exchange of RTS/CTS frame itself can suffer from the hidden terminal problem, in particular when the sender employs very aggressive contention parameters.

Moreover, the transmit power level, once increased, is not decreased after resolving the hidden terminal problem and all the subsequent transmissions take place at the increased transmit power level. The increased transmit power level results in more interference among nodes, and therefore are very likely to reduce the capacity of the wireless communication network. Hence, such a method increases interference of nodes in the transmission channel and also consumes a lot of power while transmitting the data frame.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the particular method and system for managing transmissions in a wireless communication network, in accordance with various embodiments of the present invention, it should be observed that the present invention resides primarily in combinations of method steps related to the method and system for managing transmissions in the wireless communication network. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skills in the art, having the benefit of the description herein.

In this document, the terms "comprises," "comprising", or any other variation thereof, are intended to cover a non-exclusive inclusion, such that a process, method, article or apparatus that comprises a list of elements does not include only those elements but may include other elements that are not expressly listed or inherent in such a process, method, article or apparatus. An element proceeded by "comprises . . . a" does not, without more constraints, preclude the existence of additional identical elements in the process, method, article or apparatus that comprises the element. The term "another," as used in this document, is defined as at least a second or more. The terms "includes" and/or "having," as used herein, are defined as comprising.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

For one embodiment, a method for managing transmissions in a wireless communication network is provided. The wireless communication network includes a plurality of nodes. The method at a first node of the plurality of nodes includes transmitting a data frame to a second node of the plurality of nodes. The data frame is transmitted using a first transmit power level. The method also includes determining whether an acknowledgement for the transmitted data frame is received from the second node. The acknowledgement for the transmitted data frame indicates successful transmission of the data frame to the second node. Further, the method includes determining a cause of the unsuccessful transmission when the acknowledgement is not received from the second node. Furthermore, the method includes re-transmitting the data frame to the second node when the cause of the unsuccessful transmission is determined as a collision. The data frame is re-transmitted using a second transmit power level. Furthermore, the method includes setting a transmit power level to a third transmit power level. The first transmit power level, the second transmit power level, and the third transmit power level belongs to a set of one or more transmit power levels.

For another embodiment, a method for managing transmissions in a wireless communication network is provided. The wireless communication network includes a plurality of nodes. The method at a first node of the plurality of nodes includes determining an occurrence of a collision in a transmission channel based on a power change in the transmission channel. The collision occurs when the power change sensed by the first node over a predefined time interval is more than a predefined power threshold value. The method also includes generating a configuration frame when number of collisions sensed by the first node over a predefined time period is more than a predefined threshold value. The generated configuration frame is a control or management frame. Further, the method includes transmitting the generated configuration frame to one or more nodes of the plurality of nodes.

For yet another embodiment, a first node of a plurality of nodes of a wireless communication network is provided. The first node includes a transceiver, a processor, and a power controller. The transceiver is adapted to transmit a data frame to a second node of the plurality of nodes using a transmit power level. The transmit power level is the first transmit power level selected from a set of one or more transmit power levels. Further, the transceiver is adapted to determine whether an acknowledgement for a transmitted data frame is received from the second node. The acknowledgement for the transmitted data frame indicates successful transmission the data frame to the second node. Further, the processor is adapted to determine a cause of unsuccessful transmission when the acknowledgement is not received from the second node. Moreover, the power controller is adapted to determine a second transmit power level for re-transmitting the data frame. The data frame is re-transmitted using the second transmit power level when the cause of the unsuccessful transmission is determined as a collision. The second transmit power level belongs to the set of one or more transmit power levels.

For yet another embodiment, a first node of a plurality of nodes of a wireless communication network is provided. The first node includes a processor and a transceiver. The processor is adapted to determine an occurrence of a collision in a transmission channel based on a power change in the transmission channel. The collision is indicated when the power change sensed by the first node over a predefined time interval is more than a predefined power threshold value. The processor is further adapted to generate a configuration frame when number of collisions sensed by the first node over a predefined time period is more than a predefined threshold value. The configuration frame is a control or management frame. Further, the transceiver is adapted to transmit the configuration frame to one or more nodes of the plurality of nodes.

Figure 1:
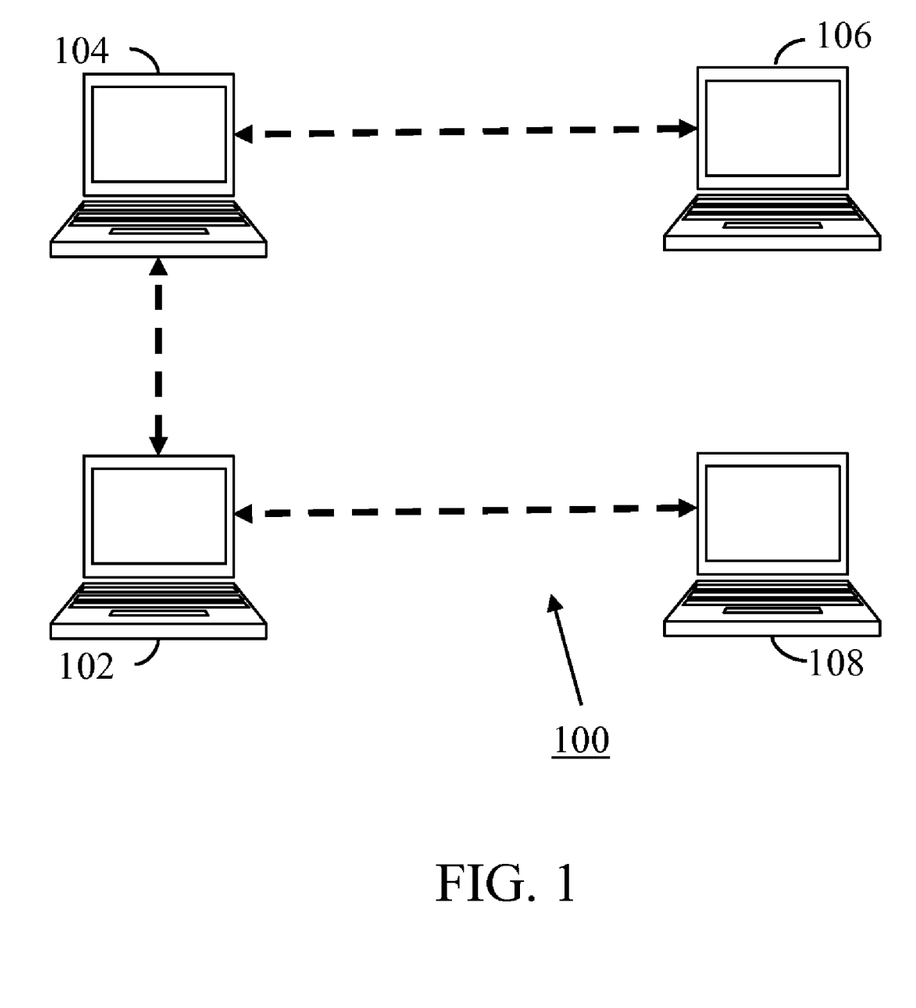
FIG. 1 illustrates a wireless communication network showing a plurality of nodes, where various embodiments of the present invention can be practiced.

FIG. 1 illustrates a wireless communication network 100, in accordance with various embodiments of the present invention. The wireless communication network 100 is a network of two or more nodes that interact with each other without any electrical conductors or wires. Further, the nodes in the wireless communication network 100 can exchange data or information among themselves. Examples of the wireless communication network 100 include, but are not limited to, a Wireless Local Area Network (WLAN), a Wireless Wide Area Network (WWAN), a Wireless Fidelity Network (Wi-Fi), a Wireless Interoperability for Microwave Access (WIMAX), a High Performance Radio Local Area Network (HIPERLAN), etc. The two or more nodes in the wireless communication network 100 interact with each other using a wireless communication link or a wireless transmission channel. Examples of the wireless transmission channel include, but are not limited to, a radio wave link, an electromagnetic wave link, a microwave link, a Bluetooth® link, and an Infrared Data Association (IrDA) link.

The wireless communication network 100 includes a first node 102, a second node 104, a third node 106, and a fourth node 108. It should be appreciated that although the FIG. 1 depicts the first node 102, the second node 104, the third node 106, and the fourth node 108, it will be apparent to a person ordinarily skilled in the art that the present invention may include more or less number of nodes. Examples of the first node 102, the second node 104, the third node 106, and the fourth node 108 include, but are not limited to, a laptop, a computer, a smart phone, a pager, a Personal Digital Assistant (PDA), a mobile phone, a transceiver at a Base Transceiver Station (BTS), and a Voice over Internet Protocol (VoIP) phone. The two or more nodes of the wireless communication network 100 communicate with each other by exchanging one or more data frames. The first node 102, the second node 104, the third node 106, and the fourth node 108 can transmit and receive the one or more data frames in the wireless communication network 100 using different types of transmission techniques. The two or more nodes can also exchange configuration frames, control frames, acknowledgement frames, management frames etc. for managing a wireless communication channel before transferring the data. Examples of transmission techniques can be a Local Multipoint Distribution Service (LMDS), a Cellular Digital Packet Data (CDPD), a Mobitex, a High Speed Downlink Packet Access (HSDPA), a Code Division Multiple Access (CDMA), a Global System for Mobile communications (GSM), a Universal Mobile telecommunications Service (UMTS), a General Packet Radio Service (GPRS), and the like.

Each node in a wireless communication network has a communication range. A node can directly transmit the data frames to only those nodes that are in the specified communication range of the node. In the wireless communication network a node is said to be in communication range of another node if the node can sense the presence of another node and can directly transmit the frames to the another node. In the wireless communication network 100, a single wireless transmission channel is shared by more than one node that is in same communication range. The more than one nodes transfer data frames from one node to another node by using the wireless transmission link or wireless transmission channel. The communication range of a node in the wireless communication network 100 depends on the transmit power level that is being used by the node to transmit a data frame. If the transmit power level used by the node is high then the communication range of the node will cover more number of nodes in the wireless communication network 100. On the other hand, if the transmit power level used by the node is low then the range of the node will cover less number of nodes in the wireless communication network 100. At the same time, the high transmit power level results in more interference among nodes in the same range and therefore reduces the capacity of the wireless communication network 100. The communication range of each node in the wireless communication network 100 can be different. For example, as shown in FIG. 1, the second node 104 and the fourth node 108 are in range of the first node 102. Similarly, the first node 102 and the third node 106 are in range of the second node 104. The nodes may create interference for other nodes while the other nodes are transmitting the frames in the wireless communication network 100. If there are more nodes in the same communication range, then there will be more interference among these nodes. The interference can result in increased number of collisions in the wireless transmission channel used by various nodes to transmit the frames. The collisions will result in unsuccessful transmissions and in turn will degrade system performance.

Each node of the two or more nodes of the wireless communication network 100 can transmit and receive one or more data frames. When two or more nodes transmit data frames to a destination node using the same channel then the data frame transmitted using higher transmit power level might be delivered at the destination node. This phenomenon is known as capture effect. According to the principles of capture effect, the data frame that was transmitted using a lower transmit power level is suppressed by the data frame transmitted using the higher transmit power level, and only the data frame transmitted using higher transmit power level might receive successfully at the destination node if the differentiation between the higher and lower transmit power level is big enough. Few nodes of the two or more nodes of the wireless communication network 100 can be out of the specified communication range of a node and are hidden to the node; hence, the node cannot sense the presence or any transmission activity of these nodes. Such nodes are called hidden nodes or hidden terminals. For example, the third node 106 is out of the communication range of the first node 102, and therefore is a hidden node for the first node 102. Similarly, the fourth node 108 is out of the communication range of the second node 108, and therefore is a hidden node for the second node 104. Increment in the number of hidden nodes in the wireless communication network 100 leads to more collisions in the wireless transmission channel, and therefore results in more number of unsuccessful transmissions and loss of data. For example, the first node 102 can transmit to and receive data frames from the second node 104 and the fourth node 108, but the first node 102 cannot sense the transmission activities of the third node 106, and hence the third node 106 is hidden for the first node 102. Let us consider that the first node 102 transmits a data frame to the second node 104, and at the same time the third node 106 also transmits another data frame to the second node 104. As the third node 106 is hidden to the first node 102, the first node 102 cannot sense the transmission activity between the second node 104 and third node 106. Similarly, the first node 102 is hidden to the third node 106, and the third node 106 cannot sense any transmission activities of the first node 102. The transmission of a data frame and another data frame at the same time will result in a collision at the second node 104. The collision occurs because the first node 102 and the third node 106 are hidden nodes to each other. Such hidden terminals create problem of unsuccessful transmission and loss of data in the wireless communication network 100. The present invention solves the problem associated with hidden terminals by temporarily adjusting the transmit power level of a transmitting node. According to the capture effect, when two nodes transmit data frames to a node simultaneously, then a data frame transmitted using high transmit power level has high probability of getting delivered at a receiving node, as compared to a data frame transmitted using a relatively lower transmit power level. For example, when the first node 102 and the third node 106 transmit the data frame to the second node 104 simultaneously, then the data frame transmitted using a higher transmit power level gets delivered at the second node 104.

Figure 2:
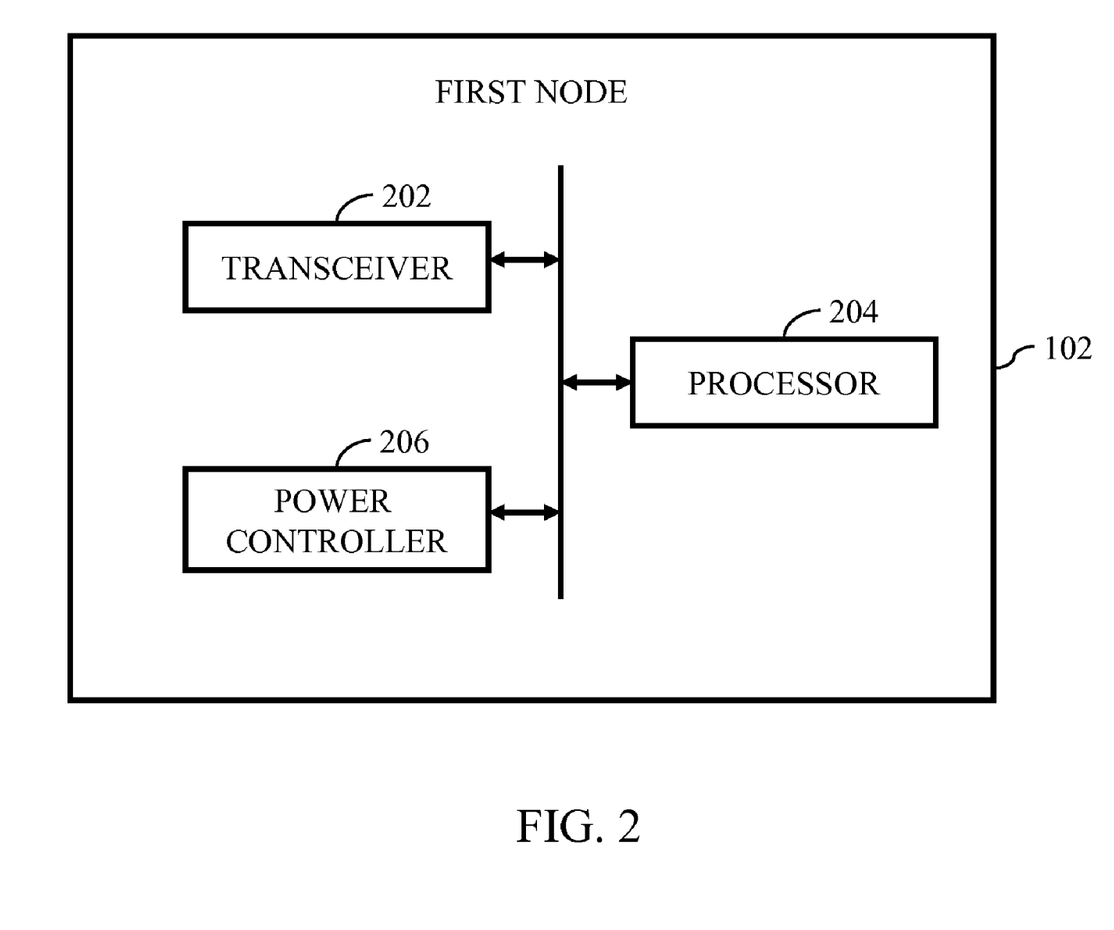
FIG. 2 illustrates a block diagram of a first node of the plurality of nodes in the wireless communication network, in accordance with some embodiments of the present invention.

FIG. 2 illustrates a block diagram of the first node 102, in accordance with various embodiment of the present invention. The first node 102 can communicate with other nodes of the wireless communication network 100 by exchanging the data frames. For example, the first node 102 communicates with the second node 104 by exchanging data frames. Examples of the first node 102 include a computer, a smart phone, a pager, a Personal Digital Assistant (PDA), a mobile phone, a transceiver at a Base Transceiver Station (BTS), a Voice over Internet Protocol (VoIP) phone, etc. The first node 102 includes a transceiver 202, a processor 204 and a power controller 206. The transceiver 202 is adapted to transmit a data frame to the second node 104 using a transmit power level. The data frame is transmitted using a first transmit power level. The transmit power level and the first transmit power level belongs to a set of one or more transmit power levels that can be used to transmit the data frames from the first node 102 to any other node in the wireless communication network 100.

The processor 204 is adapted to determine whether an acknowledgement for the transmitted data frame is received from the second node 104. For an embodiment of the present invention, the transmitter 202 can also determine whether an acknowledgement for the transmitted data frame is received from the second node 104. The acknowledgement for the transmitted data frame indicates that the data frame is successfully transmitted to the second node 104. For an embodiment, the acknowledgement for the transmitted data frame is received in form of an acknowledgement frame. The acknowledgement frame carries the acknowledgement from the second node 104 to the first node 102 for the transmitted data frame. The processor 204 is also adapted to determine a cause of an unsuccessful transmission when the acknowledgement is not received from the second node 104. The cause of the unsuccessful transmission is determined based on a configuration frame received at the first node 102 from the second node 104. The configuration frames are exchanged by the nodes in the communication network 100 to manage a wireless transmission channel used for transmitting the frames. The received configuration frame can be a control frame or a management frame. For this description, the received configuration frame is a management frame. For example, if the transmitted data frame is not delivered at the second node 104, the first node 102 determines the cause of this unsuccessful transmission based on the configuration frame (or the management frame) received from the second node 104. The received configuration frame (or the management frame) indicates that number of collisions sensed by the second node 104 over the predefined time period is more than the predefined threshold value. The predefined threshold value is a preset threshold value of the number of collisions sensed over the predefined time period. For an embodiment, the cause of an unsuccessful transmission of the data frame transmitted from the first node 102 is the collision caused due to one or more hidden nodes, such as the third node 106, in the wireless communication network 100. For another embodiment, the cause of an unsuccessful transmission of the transmitted data frame can be the collision caused due to the interference caused by one or more nodes that are in the communication range of the first node 102.

Further, the power controller 206 is adapted to determine a second transmit power level for re-transmitting the data frame. The re-transmission of the data frame takes place when the cause of the unsuccessful transmission is a collision, caused due to hidden terminals or due to interference. The second transmit power level belongs to the set of one or more transmit power levels that can be used to transmit the data frames from the first node 102 to any other node in the wireless communication network 100. The second transmit power level is selected by the power controller 206 based on one or more parameters. The one or more parameters include, but are not limited to, the lifetime associated with the data frame, the quality of service (QoS) for transmission of the data frame, the retry limit for transmitting the data frame, the priority of the data frame relative to other data frames, and size of the data frame. The retry limit of the data frame is the maximum number of attempts that are allowed for the first node 102 to transmit the data frame.

The first node 102 also includes the processor 204, which is adapted to determine an occurrence of a collision in a transmission channel based on a power change in the transmission channel. When the power change sensed by the first node 102 over a predefined time interval is more than a predefined power threshold value, a collision occurs in the wireless transmission channel. The predefined power threshold value is a preset maximum value for the power change in the wireless transmission channel. For an embodiment, the predefined time period and the predefined time interval can be different. Further, the processor 204 is adapted to generate a configuration frame when number of collisions sensed by the first node 102 over the predefined time period is more than the predefined threshold value. As has been described earlier the configuration frame could be a control frame or a management frame.

Further, the transceiver 202 is adapted to transmit the generated configuration frame (a management or a control frame), generated by processor 204, to one or more nodes of the plurality of nodes of the wireless communication network 100. For example, the transceiver 202 transmits the control frame to the second node 104 and the fourth node 108. The second node 104 and the fourth node 108 are neighboring nodes of the first node 102. Each node of the plurality of nodes of the wireless communication network 100 transmits configuration frames, control frames and management frames to share information about collisions with their neighboring nodes.

For an embodiment, the processor 204 is further adapted to update collision information of the first node 102 based on the received configuration frame (a control or a management frame) received from the second node 104. For another embodiment, the configuration frame (a control or a management frame) is received from a node of the two or more nodes of the wireless communication network 100. The processor 204 is further adapted to determine whether the wireless transmission channel is clear to transmit the data frame. The processor 204 checks for the clearance of the wireless transmission channel each time before transmitting a data frame. For the sake of this description the processor 204 and the power controller 206 are shown as separate elements. However, it should be apparent to a person skilled in the art that in various implementations of the invention, the power controller 206 and the processor 204 can be integrated as one single system element.

For example, when a data frame is transmitted by the transceiver 202 to the second node 104, the processor 204 keeps a check on whether an acknowledgement for the transmitted data frame is received or not. When the acknowledgement is not received for the transmitted data frame, the processor 204 determines the cause of unsuccessful transmission of the data frame. The cause of unsuccessful transmission is determined based on the configuration frame (a control or a management frame) received from the second node 104. When the cause of unsuccessful transmission is determined as a collision, then the power controller 206 determines the second transmit power level for re-transmitting the data frame. Afterwards, the processor 204 determines whether the wireless transmission channel is clear to transmit the data frame. The transceiver 202 then re-transmits the data frame to the second node 104 using the second transmit power level when the wireless transmission channel is clear to transmit the data frame. The occurrence of the collision in the wireless transmission channel is determined by the processor 204. The processor 204 generates a configuration frame when the number of collisions sensed by the first node 102 over the predefined time period is more than the predefined threshold value. The transceiver 202 then transmits the generated configuration frame to the second node 104 and the fourth node 108, which are neighboring nodes to the first node 102.

Figure 3:
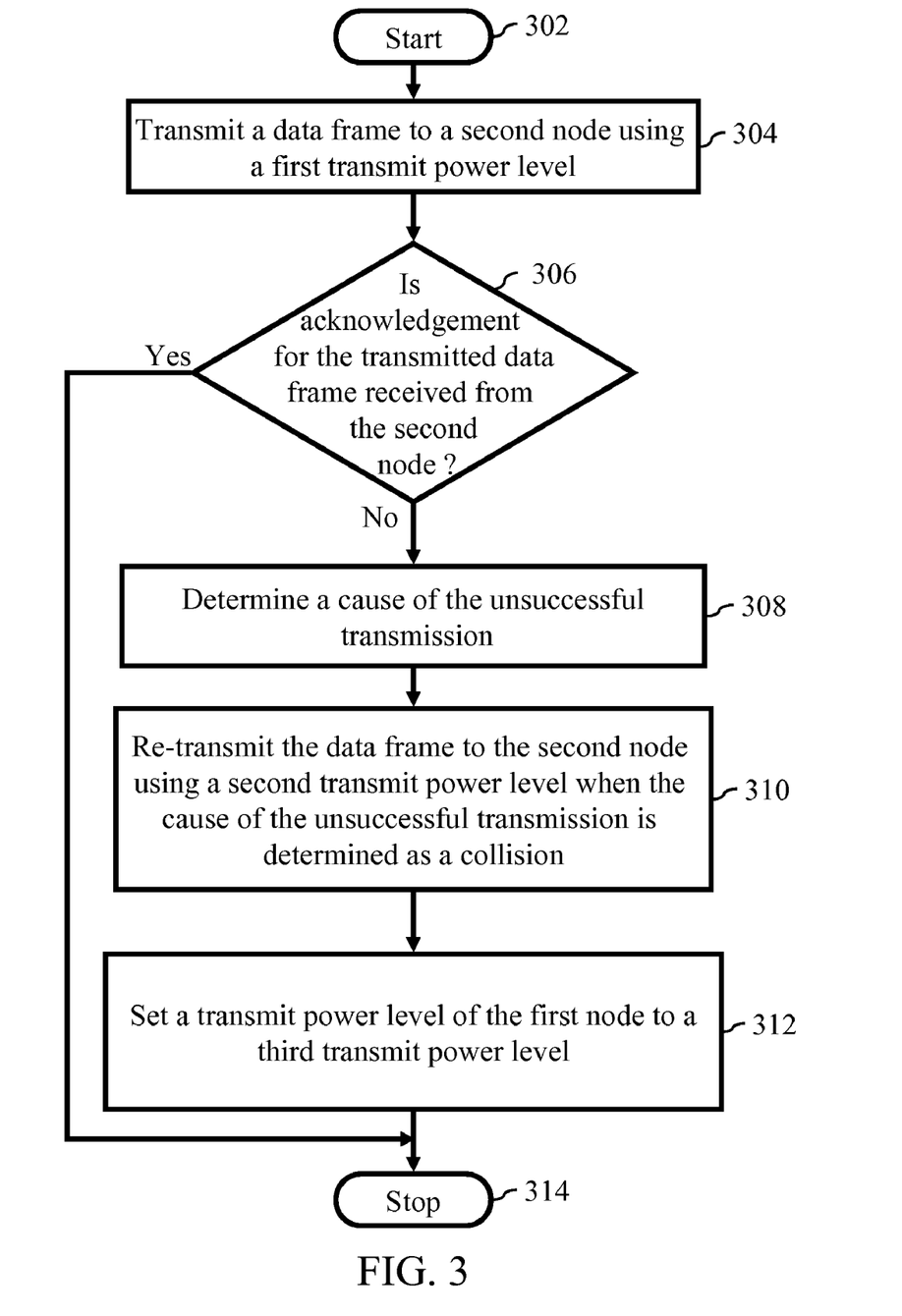
FIG. 3 is a flow diagram illustrating a method for managing transmissions in the wireless communication network, in accordance with various embodiments of the present invention.

FIG. 3 is a flow diagram illustrating a method for managing transmissions in a wireless communication network 100, in accordance with various embodiments of the present invention. The method is initiated at step 302. At step 304, a data frame is transmitted to the second node 104 using a first transmit power level. For an embodiment, the data frame is transmitted by the transceiver 202. For example, a transceiver at a laptop transmits a data frame to another laptop in the wireless communication network 100. The first transmit power level belongs to a set of one or more transmit power levels. Further at step 306, it is checked whether an acknowledgement for the transmitted data frame is received from the second node 104. For an embodiment, the processor 204 checks whether the acknowledgement for the transmitted data frame has been received or not. If the acknowledgement for the transmitted data frame is not received from the second node 104 at the first node 102, then at step 308, the cause of unsuccessful transmission is determined. The acknowledgement indicates a successful transmission of the data frame to the second node 104. For an embodiment, the cause of the unsuccessful transmission is determined by the processor 204. For another embodiment, the cause of the unsuccessful transmission is determined based on a configuration frame (a control or a management frame) received from the second node 104. The configuration frame received from the second node 104 indicates that the number of collisions sensed by the second node 104 over the predefined time period is more than the predefined threshold value. The predefined threshold value is a preset threshold value of the number of collisions sensed over the predefined time period.

At step 310, the data frame is re-transmitted to the second node 104 using a second transmit power level when the cause of the unsuccessful transmission is determined as a collision. The second transmit power level belongs to the set of one or more transmit power levels. The re-transmission of the data frame using a second transmit power level takes place when the cause of the unsuccessful transmission is determined as a collision. For an embodiment, the data frame is re-transmitted by the transceiver 202. The collision occurs in the wireless transmission channel when the power change sensed by the first node 102 over a predefined time interval is more than a predefined power threshold value. The predefined power threshold is a preset maximum value for the power change in the transmission channel. For an embodiment, an occurrence of the collision is determined by the processor 204. Further, at step 312, the transmit power level of the first node 102 is set to the third transmit power level. The third transmit power level belongs to the set of one or more transmit power levels. Thereafter, the message terminates at step 314. The third transmit power level can be less than the second transmit power level. Further, the third transmit power level can be the first transmit power level.

If at step 306 the acknowledgement for the transmitted data frame is received from the second node 104, then the method terminates at step 314. For an embodiment, the acknowledgement for the data frame transmitted by the first node 102 is an acknowledgement frame received from the second node 104.

Figure 4:
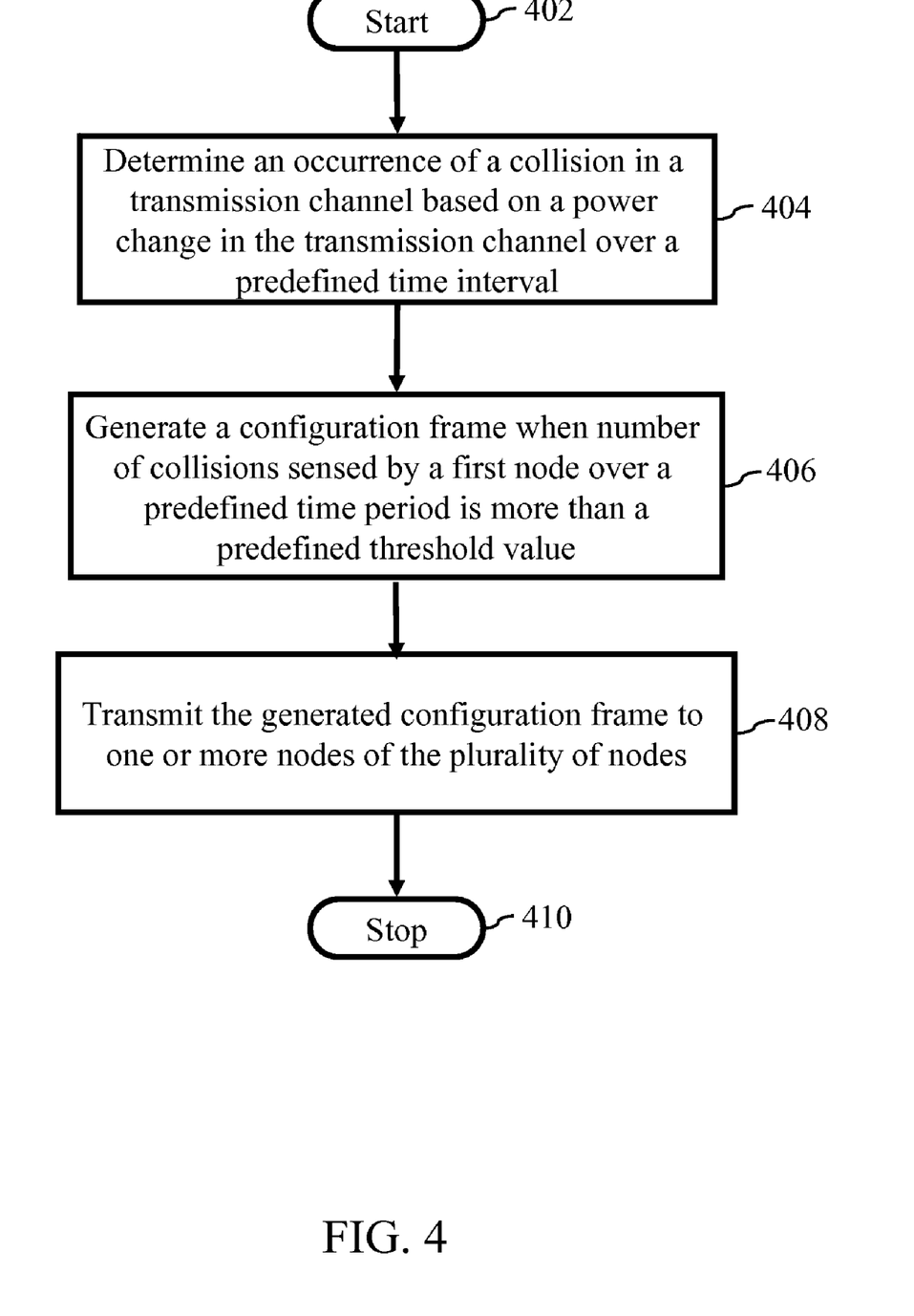
FIG. 4 illustrates a flow diagram for another method for managing transmissions in the wireless communication network, in accordance with an embodiment of the present invention.

FIG. 4 is a flow diagram illustrating a method for managing transmissions in a wireless communication network 100, in accordance with an embodiment of the invention. The wireless communication network 100 includes a plurality of nodes. The method is initiated at step 402. At step 404, an occurrence of a collision in a transmission channel is determined based on a power change in the transmission channel over a predefined time interval. The collision occurs in the transmission channel (or wireless transmission channel) when the power change sensed by the first node 102 over a predefined time interval is more than a predefined power threshold value. The predefined power threshold is a preset maximum value for the power change in the transmission channel. For an embodiment, an occurrence of the collision is determined by the processor 204. Further, at step 406, a configuration frame (a management or a control frame) is generated when number of collisions sensed by the first node 102 over a predefined time period is more than a predefined threshold value. The predefined threshold value is a preset threshold value of the number of collisions sensed over the predefined time period. For an embodiment, the configuration frame (a management or a control frame) is generated by the processor 204. For another embodiment, the predefined time interval and the predefined time period can be different.

Further, at step 408, the generated configuration frame (a management or a control frame) is transmitted to one or more nodes of the plurality of nodes of the wireless communication network 100. The one or more nodes are the neighboring nodes of the first node 102. For example, the transceiver 202 of the first node 102 transmits the generated configuration frame (a management or a control frame) to the second node 104 and the fourth node 108. The second node 104 and the fourth node 108 are neighboring nodes of the first node 102. Each node of the plurality of nodes can share information about collisions with other nodes of the plurality of nodes by exchanging different types of frames like configuration frames, control frames, management frames etc. For example the second node 104 shares information about the collisions with the first node 102 using the management frames. Thereafter, at step 410, the method terminates.

Figure 5:
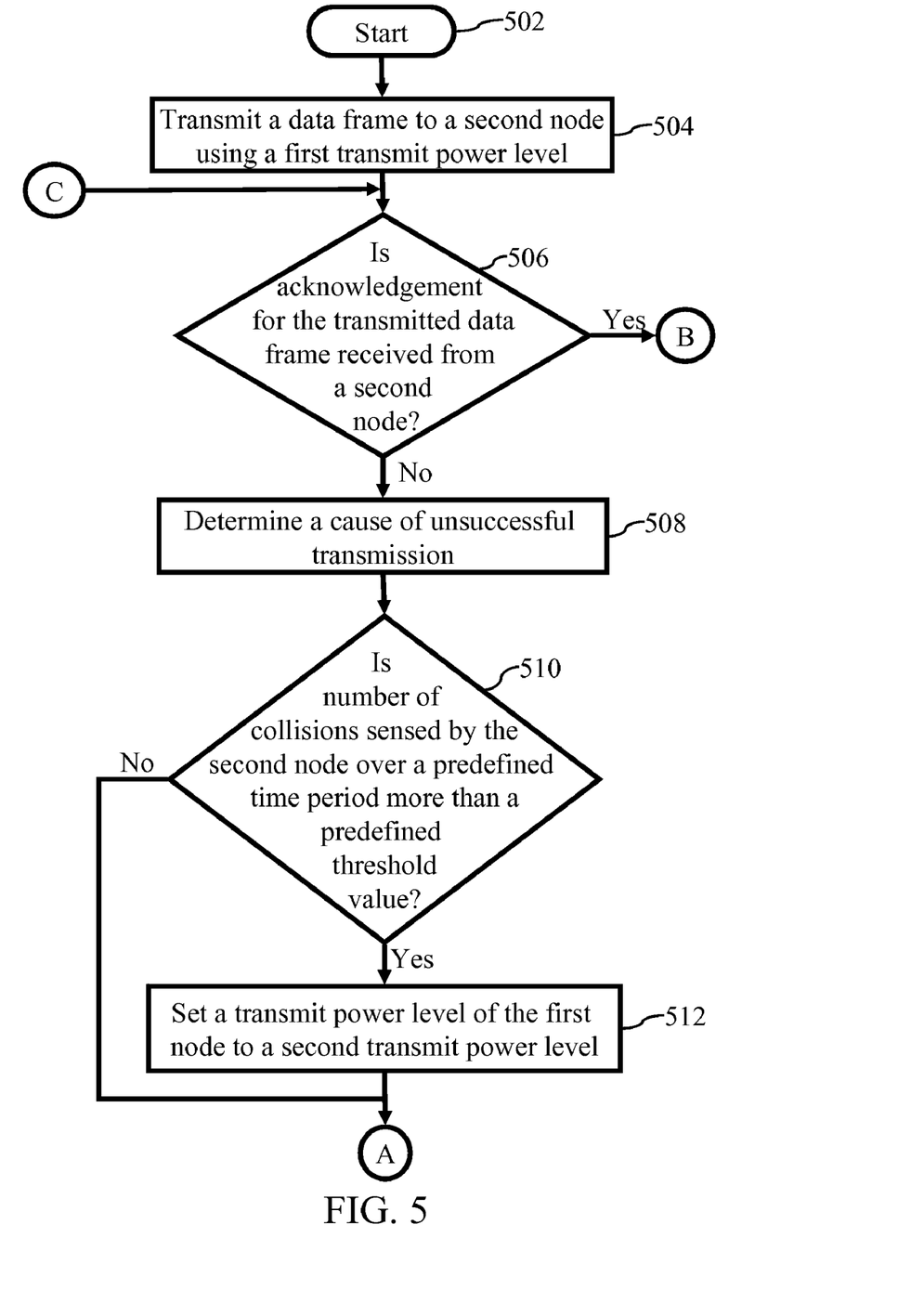
FIGS. 5 and 6 is a flow diagram illustrating a detailed method for managing transmissions in the wireless communication network, in accordance with another embodiment of the present invention.
Figure 6:
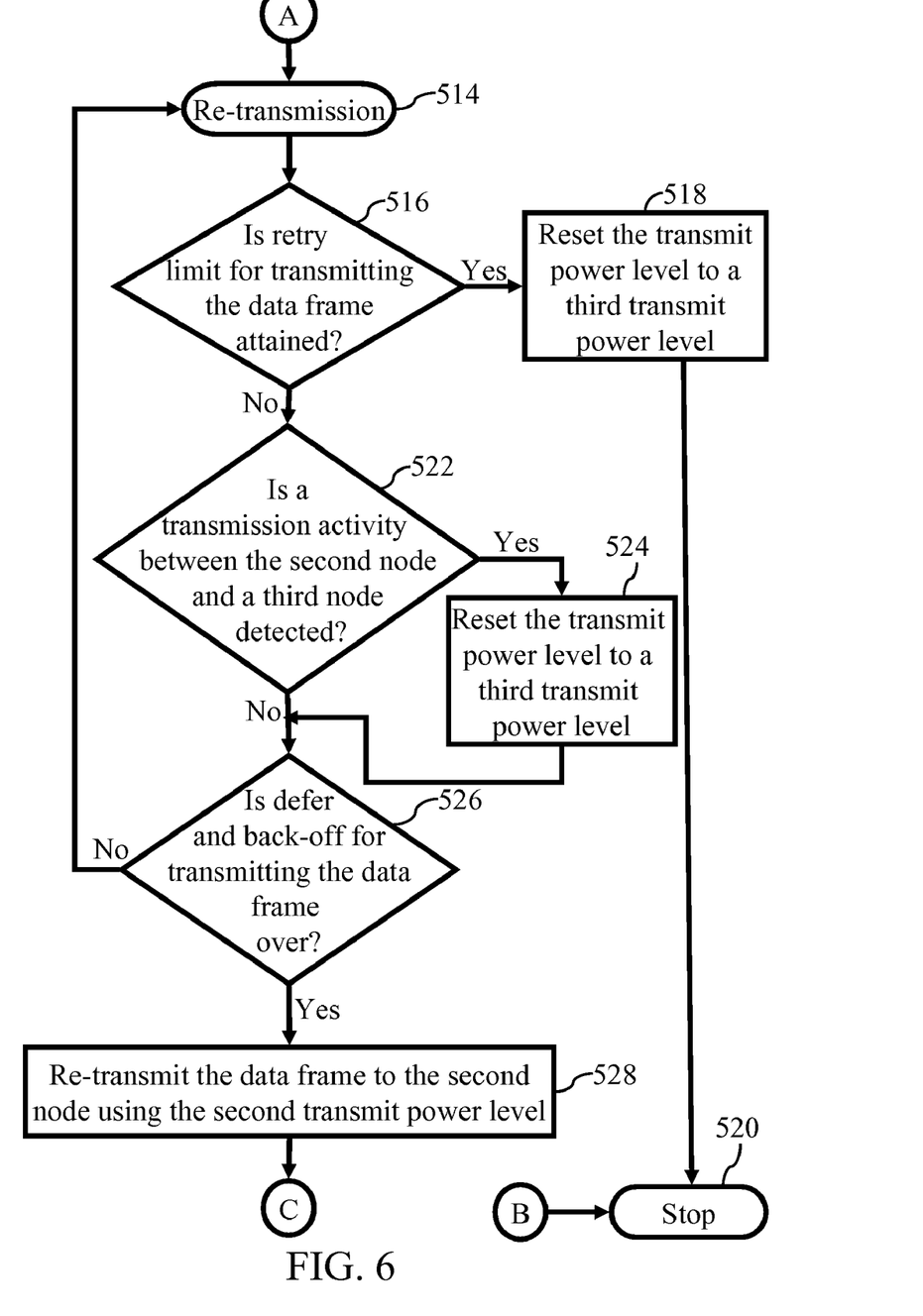

FIGS. 5 and 6 show a flow diagram illustrating a method for managing transmissions in the wireless communication network 100, in accordance with yet another embodiment of the present invention. The method is initiated at step 502. At step 504, a data frame is transmitted to a second node 104 using a first transmit power level. The first transmit power level belongs to a set of one or more transmit power levels. For an embodiment, the data frame is transmitted by the transceiver 202. For another embodiment, the method further includes determining whether a transmission channel (or a wireless transmission channel) is clear to transmit the data frame. For another embodiment, the processor 204 determines whether the transmission channel is clear to transmit the data frame, prior to each transmission of the data frame. The first transmit power level belongs to a set of one or more transmit power levels. The one or more transmit power level can be defined by a system or a network administrator or can be determined based on different parameters of the wireless communication network 100. At step 506, it is checked whether an acknowledgement for the transmitted data frame is received from the second node 104. The acknowledgement can be received as an acknowledgement frame. The acknowledgement frame carries acknowledgement information confirming the successful delivery of the data frame at the second node 104. For an embodiment, the receiving of the acknowledgement from the second node 104 is checked by the processor 204. If the acknowledgement is not received from the second node 104, then step 508 is performed. If the acknowledgement for the transmitted data frame has been received from the second node 104, then the method terminates at step 520.

At step 508, a cause of unsuccessful transmission is determined. For an embodiment, the cause of unsuccessful transmission is determined based on a configuration frame received from the second node 104. The configuration frame can be a management frame or a control frame. The received configuration frame received from the second node 104 indicates that the number of collisions sensed by the second node 104 over a predefined time period is more than a predefined threshold value. The predefined threshold value is a preset threshold value of the number of collisions sensed over the predefined time period. For an embodiment, the method further includes updating collision information of the first node 102 based on the received configuration frame received from the second node 104. A collision occurs in a transmission channel when the power change sensed by the first node 102 over a predefined time interval is more than a predefined power threshold value. The predefined power threshold is a preset maximum value for the power change in the transmission channel. For another embodiment, an occurrence of the collision is determined by the processor 204. For yet another embodiment, the cause of unsuccessful transmission is determined by the processor 204. The cause of the collision can be the interference caused by one or more hidden nodes or hidden terminals. The predefined time interval can be different from the predefined time period.

At step 510, it is checked whether the number of collisions sensed by the second node 104 over the predefined time period is more than the predefined threshold value. If the number of collisions sensed by the second node 104 over the predefined time period is more than the predefined threshold value, then step 512 is performed. At step 512, the transmit power level of the first node 102 is set to a second transmit power level. The second transmit power level is selected from the set of one or more transmit power levels. The new transmit power level is selected by the power controller 206 based on one or more parameters. Examples of the one or more parameters include, but are not limited to, the lifetime associated with the data frame, the quality of service (QoS) for transmission of the data frame, the retry limit for transmitting the data frame, the priority of the data frame, and the size of the data frame. If at step 510 the number of collisions sensed by the second node 104 over the predefined time period is not more than the predefined threshold value, then the first node 102 transitions to step 514. Step 514 represents a state that the first node 102 retransmits the data frame.

Further, at step 516, it is determined whether a retry limit for transmitting the data frame has been attained. The retry limit of the data frame is the maximum number of attempts that are allowed for the first node to transmit the data frame. If the retry limit has been attained, then step 518 is performed. For an embodiment, the processor 204 can check whether the retry limit for transmitting the data frame is attained or not. Further, at step 518, the transmit power level of the first node 102 is set to a third transmit power level. The third transmit power level is also selected from the set of one or more transmit power levels. If the retry limit has not been attained, then step 522 is performed. For an embodiment, the third transmit power level is selected by the power controller 206 based on the one or more parameters.

At step 522, a transmission activity between the second node 104 and a third node 106 is detected. If a transmission activity between the second node 104 and the third node 106 is detected, then step 524 is performed. A transmission activity is detected between the second node 104 and the third node 106, if exchange of data frames is going on between these nodes. For an embodiment, the processor 204 detects the transmission activity between the second node 104 and the third node 106. If at step 522, no transmission activity is detected between the second node 104 and the third node 106, then step 526 is performed. Further, at step 526, it is checked whether defer and back-off for transmitting the data frame is over. If the defer and back-off is over, then step 528 is performed. The back-off for the data frame is the time for which the transceiver 202 should wait before re-transmitting the data frame. At step 528, the data frame is re-transmitted to the second node using the second transmit power level. Thereafter, the method goes back to the step 506.

Various embodiments of the present invention offer one or more advantages. The present invention provides a method and system for managing transmissions in a wireless communication network. The method enables the efficient delivery of data frames in the wireless communication network. The method also resolves the problem of hidden terminal by temporarily increasing the transmit power level of a transmitting node in the wireless communication network. This results in successful delivery of the data frames in the wireless communication network. The method also enhances network capacity by decreasing the number of collisions. The method increases the probability of successful delivery of the data frames in the wireless communication network. The method will also decrease the number of access points that need to be deployed in order to overcome the hidden nodes or hidden terminals in the wireless communication network.

It will be appreciated that the method and system for managing transmissions in the wireless communication network, described herein, may comprise one or more conventional processors and unique stored program instructions that control the one or more processors, to implement, in conjunction with certain non-processor circuits, some, most, or all of the functions of the system described herein. The non-processor circuits may include, but are not limited to, signal drivers, clock circuits, power-source circuits, and user-input devices. As such, these functions may be interpreted as steps of the method and system for managing transmissions in the wireless communication network. Alternatively, some or all the functions can be implemented by a state machine that has no stored program instructions, or in one or more application-specific integrated circuits (ASICs), in which each function, or some combinations of certain of the functions, are implemented as custom logic. Of course, a combination of the two approaches can also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, the invention and its benefits and advantages have been described with reference to specific embodiments. However, one with ordinary skill in the art would appreciate that various modifications and changes can be made, without departing from the scope of the present invention, as set forth in the claims below. Accordingly, the specification and the figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

What is claimed is:

1. A method for managing transmissions in a wireless communication network, the wireless communication network comprising a plurality of nodes, the method at a first node of the plurality of nodes comprising:

transmitting a data frame to a second node of the plurality of nodes using a first transmit power level, wherein the first transmit power level belongs to a set of one or more transmit power levels;

determining whether an acknowledgement for the data frame is received from the second node, wherein the acknowledgement for the data frame indicates successful transmission of the data frame to the second node;

determining a cause of unsuccessful transmission when the acknowledgement is not received from the second node, wherein the cause of unsuccessful transmission is determined based on a configuration frame received from the second node and wherein the configuration frame is received subsequent to transmitting the data frame;

re-transmitting the data frame to the second node using a second transmit power level when the cause of unsuccessful transmission is determined as a collision, wherein the second transmit power level belongs to the set of one or more transmit power levels; and setting a transmit power level to a third transmit power level, wherein the third transmit power level belongs to the set of one or more transmit power levels.

2. The method as recited in claim 1, wherein the configuration frame is a management frame indicating that number of collisions sensed by the second node over a predefined time period is more than a predefined threshold value, and wherein the method further comprises transmitting the configuration frame to one or more nodes of the plurality of nodes.

3. The method as recited in claim 1 further comprising:
determining an occurrence of the collision in a transmission channel based on a power change in the transmission channel, wherein the collision occurs when the power change sensed by the first node over a predefined time interval is more than a predefined power threshold value;

generating the configuration frame when number of collisions sensed by the first node over a predefined time period is more than a predefined threshold value, wherein the configuration frame is a control frame; and transmitting the configuration frame to one or more nodes of the plurality of nodes.

4. The method as recited in claim 1 further comprising determining the second transmit power level for re-transmitting the data frame.

5. The method as recited in claim 4, wherein determining the second transmit power level comprises selecting the second transmit power level based on at least one of a lifetime associated with the data frame, a quality of service (QoS) for transmission of the data frame, a retry limit for transmitting the data frame, a priority of the data frame, and a size of the data frame.

6. The method as recited in claim 1 further comprising determining at the first node if a transmission channel is clear to transmit the data frame.

7. The method as recited in claim 1 further comprising detecting a transmission activity between the second node and a third node of the plurality of nodes, prior to setting the transmit power level.

8. The method as recited in claim 1 further comprising checking if a retry limit for transmitting the data frame is attained, prior to setting the transmit power level, wherein the retry limit is the maximum number of attempts that are allowed for the first node to transmit the data frame.

9. The method as recited in claim 1 further comprising updating collision information of the first node based on the configuration frame received from the second node, wherein the configuration frame is one or more of a management frame and a control frame.

10. The method as recited in claim 1, wherein the third transmit power level is the first transmit power level.

11. A method for managing transmissions in a wireless communication network, the wireless communication network comprising a plurality of nodes, the method at a first node of the plurality of nodes comprising:
determining an occurrence of a collision in a transmission channel based on a power change in transmissions received via the transmission channel wherein the collision occurs when the power change sensed by the first node over a predefined time interval is more than a predefined power threshold value;

generating, by the first node, a configuration frame when a number of collisions sensed by the first node over a predefined time period is more than a predefined threshold value, wherein the configuration frame is a control frame; and transmitting the configuration frame to one or more nodes of the plurality of nodes.

12. The method as recited in claim 11 further comprising:
transmitting a data frame to a second node of the plurality of nodes using a first transmit power level, wherein the first transmit power level belongs to a set of one or more transmit power levels;

determining whether an acknowledgement for the data frame is received from the second node, wherein the acknowledgement for the data frame received frame indicates successful transmission of the data frame to the second node;

determining a cause of unsuccessful transmission when the acknowledgement is not received from the second node;

re-transmitting the data frame to the second node using a second transmit power level when the cause of the unsuccessful transmission is determined as the collision, wherein the second transmit power level belongs to the set of one or more transmit power levels; and setting a transmit power level to a third transmit power level, wherein the third transmit power level belongs to the set of one or more transmit power levels.

13. The method as recited in claim 12, wherein the cause of unsuccessful transmission is determined based on a configuration frame received from the second node, further wherein the configuration frame received from the second node is one or more of a management frame and a control frame and indicates that a number of collisions sensed by the second node over a predefined time period is more than a predefined threshold value.

14. The method as recited in claim 11 further comprising updating collision information of the first node based on a configuration frame received from the second node, wherein the configuration frame received from the second node is a management frame.

15. A first node of a plurality of nodes of a wireless communication network comprising:
a transceiver capable of:
transmitting a data frame using a transmit power level to a second node of the plurality of nodes, wherein the transmit power level is the first transmit power level that belongs to a set of one or more transmit power levels;

a processor capable of:
determining whether an acknowledgement for the data frame is received from the second node, wherein the acknowledgement for the data frame indicates successful transmission of the data frame to the second node; and determining a cause of unsuccessful transmission when the acknowledgement is not received from the second node, wherein the cause of unsuccessful transmission is determined based on a configuration frame received from the second node and wherein the configuration frame is received subsequent to transmitting the data frame; and a power controller capable of:

determining a second transmit power level for re-transmitting the data frame when the cause of the unsuccessful transmission is determined as a collision, wherein the second transmit power level belongs to the set of one or more transmit power levels.

16. The first node as recited in claim 15, wherein the processor is further capable of:

determining an occurrence of a collision in the transmission channel based on a power change in the transmission channel, wherein the collision occurs when the power change sensed by the first node over a predefined time interval is more than a predefined power threshold value; and generating, by the first node, a configuration frame when number of collisions sensed by the first node over a predefined time period is more than a predefined threshold value, wherein the generated configuration frame generated by the first node is a control frame.

17. The first node as recited in claim 16, wherein the processor is further capable of determining if the transmission channel is clear to transmit the data frame.

18. The first node as recited in claim 15, wherein the processor is further capable of updating collision information of the first node based on a the configuration frame received from the second node, wherein the configuration frame received from the second node is a management frame.

19. The first node as recited in claim 15, wherein the power controller determines the second transmit power level based on at least one of a lifetime associated with the data frame, a quality of service (QoS) for transmission of the data frame, a retry limit for transmitting the data frame, a priority of the data frame, and a size of the data frame.

20. The first node as recited in claim 15, wherein the configuration frame is a management frame indicating that number of collisions sensed by the second node over a predefined time period is more than a predefined threshold value, and wherein the method further comprises transmitting the configuration frame to one or more nodes of the plurality of nodes.

21. A first node of a plurality of nodes of a wireless communication network comprising:

a processor capable of:

determining an occurrence of a collision in a transmission channel based on a power change in transmissions received via the transmission channel wherein the collision occurs when the power change sensed by the first node over a predefined time interval is more than a predefined power threshold value; and generating, by the first node, a configuration frame when a number of collisions sensed by the first node over a predefined time period is more than a predefined threshold value, wherein the configuration frame is a control frame; and a transceiver capable of transmitting the configuration frame to one or more nodes of the plurality of nodes.

22. The first node as recited in claim 21, wherein the transceiver is further capable of:

transmitting a data frame to a second node of the plurality of nodes using a transmit power level, wherein the transmit power level is a first transmit power level that belongs to a set of one or more transmit power levels;

determining whether an acknowledgement for the data frame is received from the second node, wherein the acknowledgement for data frame indicates successful transmission of the data frame to the second node; and determining a cause of unsuccessful transmission when the acknowledgement is not received from the second node.

23. The first node as recited in claim 22 further comprising a power controller capable of:

determining a second transmit power level for re-transmitting the data frame when the cause of unsuccessful transmission is determined as the collision, wherein the second transmit power level belongs to a set of one or more transmit power levels.

24. The first node as recited in claim 23, wherein the second transmit power level is determined based on at least one of a lifetime associated with the data frame, a Quality of Service (QoS) for transmission of the data frame, a retry limit for transmitting the data frame, a priority of the data frame, and a size of the data frame.

25. The first node as recited in claim 21, wherein the processor is further capable of updating collision information of the first node based on a configuration frame received from the second node, wherein the configuration frame received from the second node is a management frame.

26. The first node as recited in claim 21, wherein the processor is further capable of determining if the transmission channel is clear to transmit a data frame.

* * * * *